US012589689B2

(12) United States Patent (10) Patent No.: US 12,589,689 B2
Del Rosario (45) Date of Patent: Mar. 31, 2026

(54) TAIL LIGHT INNER BRACKET AND FLEXIBLE LIGHT EMITTING PANEL

(71) Applicant: DR DESIGN, LLC, Los Angeles, CA (US)

(72) Inventor: Lee Del Rosario, Los Angeles, CA (US)

(73) Assignee: DR DESIGN, LLC, Los Angeles, CA (US)

( * ) Notice: Subject to any disclaimer, the term of this patent is extended or adjusted under 35 U.S.C. 154(b) by 0 days.

(21) Appl. No.: 18/870,372

(22) PCT Filed: May 25, 2023

(86) PCT No.: PCT/US2023/067447
§ 371 (c)(1),
(2) Date: Nov. 27, 2024

(87) PCT Pub. No.: WO2023/235669
PCT Pub. Date: Dec. 7, 2023

(65) Prior Publication Data
US 2025/0326353 A1 Oct. 23, 2025

Related U.S. Application Data

(60) Provisional application No. 63/365,494, filed on May 30, 2022.

(51) Int. Cl.
*B60Q 1/44* (2006.01)
*B62D 25/08* (2006.01)
(Continued)

(52) U.S. Cl.
CPC ............. *B60Q 1/44* (2013.01); *B62D 25/087* (2013.01); *B62D 25/10* (2013.01); *F21S 43/145* (2018.01); *F21S 43/19* (2018.01)

(58) Field of Classification Search
CPC .. B60Q 2400/10; B60Q 2900/10; B60Q 1/30; F21S 43/145; B62D 25/087; B62D 25/10
See application file for complete search history.

(56) References Cited

U.S. PATENT DOCUMENTS 4,644,449 A 2/1987 Smith-Williams
4,796,165 A 1/1989 Metti
(Continued)

FOREIGN PATENT DOCUMENTS

JP 2021018952 A 2/2021
KR 20110084779 A * 7/2011 ............. F21S 41/39
KR 101628046 B1 6/2016

OTHER PUBLICATIONS

International Search Report and Written Opinion of PCT Application No. PCT/US2023/067447 mailed Sep. 26, 2023, 11 pgs.

*Primary Examiner* — Robert J May
(74) *Attorney, Agent, or Firm* — Buchalter LLP

(57) ABSTRACT

Rear tail light and turn signal assemblies are disclosed. The rear tail lights and turn signal assemblies are configured to work with existing housing and wiring and provide greater visibility, thereby improving safety. A tail light assembly comprises a housing defining an inner surface of the tail light assembly affixable to a body of a motor vehicle by a fastener, a light source positionable within an interior of the housing, a flexible light panel positionable over at least a portion of the light source, and one or more lenses positionable over the flexible light panel.

18 Claims, 10 Drawing Sheets

(51) Int. Cl.
    *B62D 25/10*         (2006.01)
    *F21S 43/145*      (2018.01)
    *F21S 43/19*       (2018.01)

(56)              References Cited

U.S. PATENT DOCUMENTS

| | | | |
|---|---|---|---|
| 5,335,155 | A | 8/1994 | Hanson et al. |
| 5,519,588 | A | 5/1996 | Sobeck et al. |
| 6,404,334 | B1 | 6/2002 | Chao |
| 6,520,669 | B1 * | 2/2003 | Chen ........................ F21S 43/14 |
| | | | 313/511 |
| 6,814,459 | B2 | 11/2004 | Pederson |
| 9,310,044 | B2 | 4/2016 | Pusch et al. |
| 10,458,616 | B2 | 10/2019 | Orisich et al. |
| 10,462,858 | B2 | 10/2019 | Shido et al. |
| 11,046,239 | B1 | 6/2021 | Lepage et al. |
| 11,092,309 | B2 | 8/2021 | Norris et al. |
| 2009/0122566 | A1 | 5/2009 | Cunningham |
| 2012/0262934 | A1 | 10/2012 | Disley et al. |
| 2018/0180260 | A1 | 6/2018 | Chikama et al. |
| 2021/0221282 | A1 | 7/2021 | Lepage et al. |

\* cited by examiner

TAIL LIGHT INNER BRACKET AND FLEXIBLE LIGHT EMITTING PANEL

CROSS-REFERENCE

This application claims the benefit of U.S. Provisional Application No. 63/365,494, filed May 30, 2022, entitled TAIL LIGHT INNER BRACKET AND PANELS which application is incorporated herein in its entirety by reference.

BACKGROUND

Aftermarket automotive parts and components was valued at 17 billion (USD) in 2020 and is expected to reach 19 billion (USD) by 2026. Aftermarket automotive parts often particularly appeal to classic car enthusiasts, such as Porsche owners. Of the aftermarket parts, rear tail light and turn signal assemblies are amongst the most popular. One disadvantage to older cars is the visibility of the rear tail lights. Low or reduced visibility can negatively impact safety.

What is needed is a device for improving the visibility of the rear lights in a car that is adapted to work with the existing housing and wiring.

SUMMARY

Disclosed are rear tail light/turn signal assemblies, flexible light panels and vehicles incorporating the same. The disclosed light panels, rear tail lights and turn signal assemblies are configured to be incorporated into a lighting assembly or to work with existing housing and wiring. The disclosed rear tail lights and turn light assemblies provide greater visibility, thereby improving safety.

Flexible light panels can be part of an assembly and/or installed or incorporated into a vehicle. The light panels comprise: a first edge, a second edge, a third edge and a fourth edge; a first cutout on the second edge positioned midway between the first edge and the third edge; and a pair of wires with female terminals extending from the first edge of the light panel near the fourth edge of the light panel, wherein the flexible light panel has a length greater than a width and a first edge along a length, a second edge along a width oriented at a 90 degree angle from the first edge, a third edge along the length oriented at a 90 degree angle from the second edge, and a fourth edge along the width oriented at an angle less than 90 degrees to the third edge. A second cutout can be provided on the fourth edge positioned midway between the third edge and the first edge. Additionally, the flexible light panel can be a electroluminescent light panel. The cutout surrounded on three sides by a red electroluminescent lamp with light overprint. An area of circuitry can also be provided on a silk screened border around a perimeter of the flexible light panel.

Both the foregoing general description and the following detailed description are exemplary and explanatory only and are not restrictive of the disclosed embodiments, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

US 2009/0122566 A1 published May 14, 2009, for Vehicle tail light assembly and method of use by Cunningham;

US 2012/0262934 A1 published Oct. 18, 2012 for Tail light assembly for a motor vehicle by Disley, et al.;

US 2021/0221282 A1 published Jul. 22, 2021 for Tail light assembly by LePage et al.;

U.S. Pat. No. 4,644,449 A issued Feb. 17, 1987 for Light bracket by Smith Williams;

U.S. Pat. No. 4,796,165 A issued Jan. 3, 1989 for Vehicle tail light construction by Metti;

U.S. Pat. No. 5,335,155 A issued Aug. 2, 1994 for Tail light construction by Hanson, et al.;

U.S. Pat. No. 5,519,588 A issued May 21, 1996 for Tail light assembly by Sobeck, et al.;

U.S. Pat. No. 6,404,334 B1 issued Jun. 11, 2002 for Taillight module for motor vehicle by Chao;

U.S. Pat. No. 6,814,459 B2 issued Nov. 9, 2004 for LED light bar Pederson;

U.S. Pat. No. 9,310,044 B2 issued Apr. 12, 2016 for Motor vehicle taillight by Pusch, et al.;

U.S. Pat. No. 10,458,616 B2 issued Oct. 29, 2019-10-29 for Fiber optic lighting and/or signaling system for a vehicle by Orisich et al.;

U.S. Pat. No. 11,092,309 B2 issued Aug. 17, 2021 for Multi-colored vehicle rear lamp by Norris et al.; and U.S. Pat. No. 11,046,239 B1 issued Jun. 29, 2021 for Tail light assembly by LePage et al.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
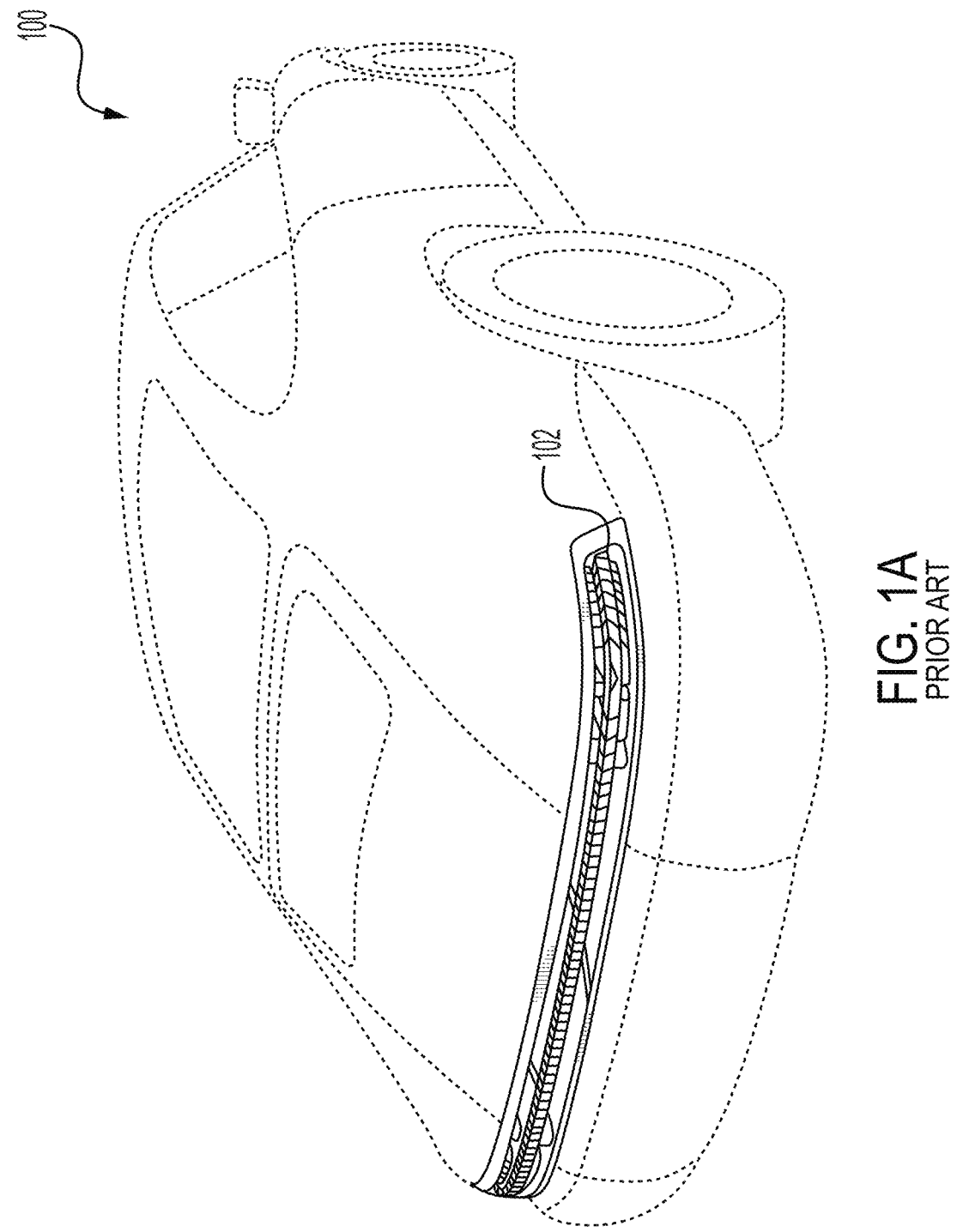
FIG. 1A depicts a car from a rear perspective.

FIG. 1A depicts a vehicle 100 from a rear perspective. A typical motor vehicle includes a tail light assembly. The tail light assembly is often affixed to a body component of the motor vehicle. The body component at the rear of the motor vehicle often operates to define an exterior of a trunk of the motor vehicle. The edge of the body component that defines the opening of the trunk is the trunk gutter. The trunk gutter is the portion of the body component that is overlapped by the trunk lid when the trunk lid is in a closed position. A distal edge of the trunk gutter can further include a weather strip that is affixed to the distal edge by an interference fit with, for example, fingers located within the weather strip for sealing the trunk when the trunk lid is in a closed position.

The vehicle features a rear light 102. The rear light 102 can be on the right side and the left side (driver side, passenger side) of the vehicle, and can further include lights that are activated to represent different conditions: stop (brake), reverse, turn, parking. The illustrated vehicle is a vehicle manufactured by Porsche®.

Figures 1B, 1C, 1D:
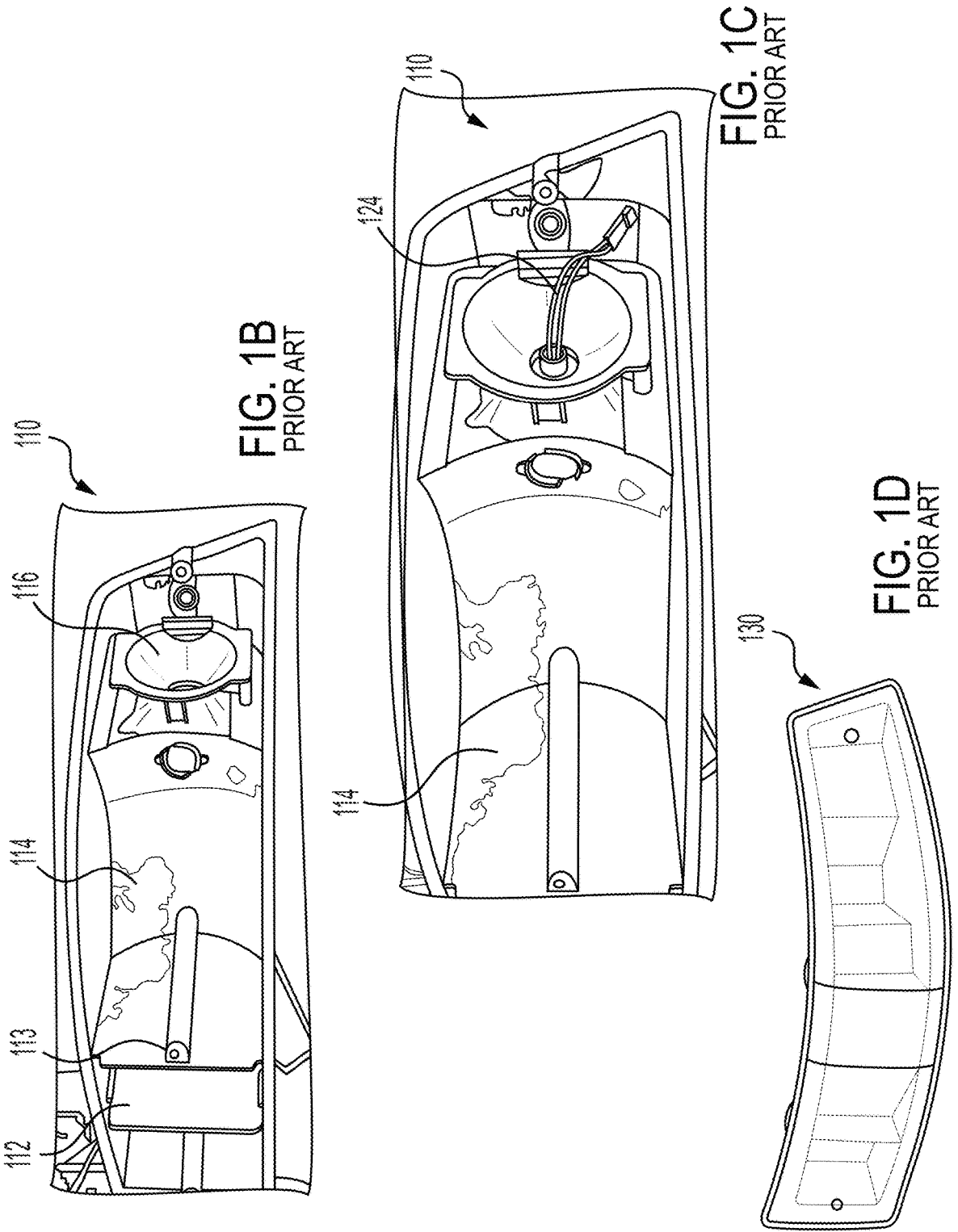
FIGS. 1B-1D illustrate a tail light housing and lens.

FIGS. 1B-1D illustrate a tail light housing 110 and lens 130. The tail light housing 110 has an outer frame and an interior or inner surface with multiple recesses to accommodate a light source for the light indicating stopping, the light indicating reversing, the light indicating turning and the light indicating parking. The brake light recess 112 is positioned at an interior end of the tail light housing, the reverse light recess 114 is positioned in the middle of the housing, and the turn light recess 116 is positioned at an exterior end of the tail light housing. One or more threaded apertures 113 are provided to secure the tail light housing 110 to the vehicle via a fastener. Wires 124 are provided that pass through apertures in the tail light housing 110 and connect to, for example, a light bulb positioned in a recess. Brackets can also be used to secure the housing to the vehicle.

Figures 2A, 2B:
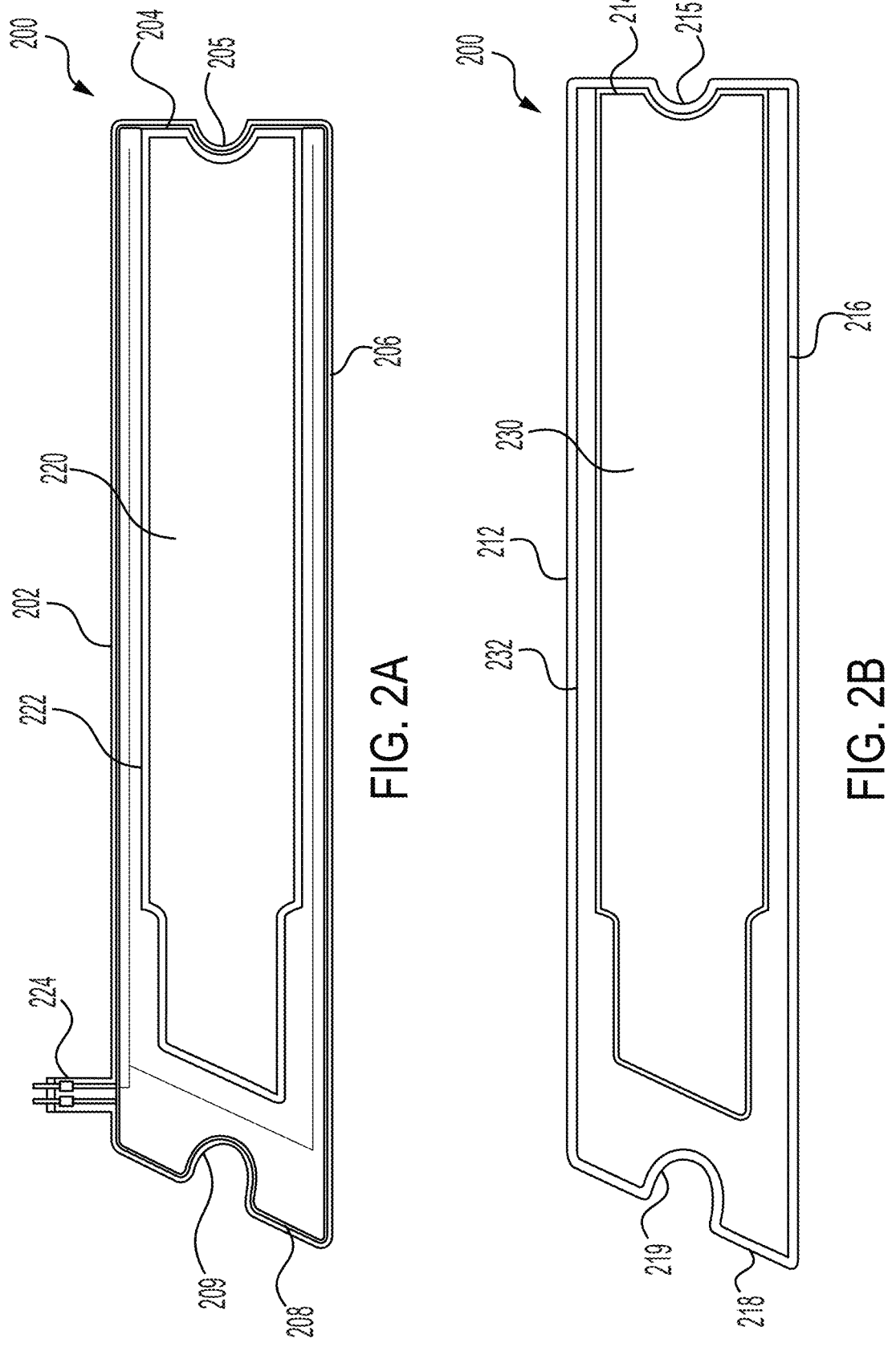
FIGS. 2A-2B illustrate a first flexible light panel.

FIGS. 2A-2B illustrate a first flexible light panel 200 suitable for use with a tail light housing for a 911 Porsche. The flexible light panel 200 can be an electroluminescent light panel (EL light panel). FIG. 2A is a view of the back of the flexible light panel (i.e., the side that faces into the interior of the tail light housing) and FIG. 2B is a view of the front of the flexible light panel (i.e., the side that faces the outside of the vehicle and is positioned adjacent the lens). The flexible light panel 200 has a length greater than a width, more specifically a width of 2.834 inches and a length of 14.565 inches. The flexible light panel 200 has a flexible substrate with a cutout 220. A first edge 202 is along a length, a second edge 204 along a width is at a 90 degree angle from the first edge 202, a third edge 206 is along the length at a 90 degree angle from the second edge 204, and a fourth edge 208 along the width has an angle less than 90 degrees to the third edge and greater than 90 degrees to the first edge. A first concave recess 205 or cutout is provided on the second edge 204, midway between the first edge 202 and the third edge 206. A second concave recess 209 or cutout is provided on the fourth edge 208 midway between the third edge 206 and the first edge 202. A pair of wires 224 with female terminals extend from the first edge 202 of the light panel near the fourth edge 208 of the light panel. An area of circuitry 222 is shown on a silk screened border around the perimeter of the flexible light panel 200 which surrounds three sides of the cutout 220. The front side of the flexible light panel with the circuitry removed and an overprint included is illustrated in FIG. 2B. A first edge 212 is along a length, a second edge 214 along a width is at a 90 degree angle from the first edge 212, a third edge 216 is along the length at a 90 degree angle from the second edge 214, and a fourth edge 218 along the width has an angle less than 90 degrees to the third edge and greater than 90 degrees to the first edge. A first concave recess 215 is provided on the second edge 214, midway between the first edge 212 and the third edge 216. A second concave recess 219 is provided on the fourth edge 218 midway between the third edge 216 and the first edge 212. The cutout 230 is surrounded on three sides by a red EL lamp 232 with light overprint to achieve a less fluorescent effect.

Figures 3A, 3B:
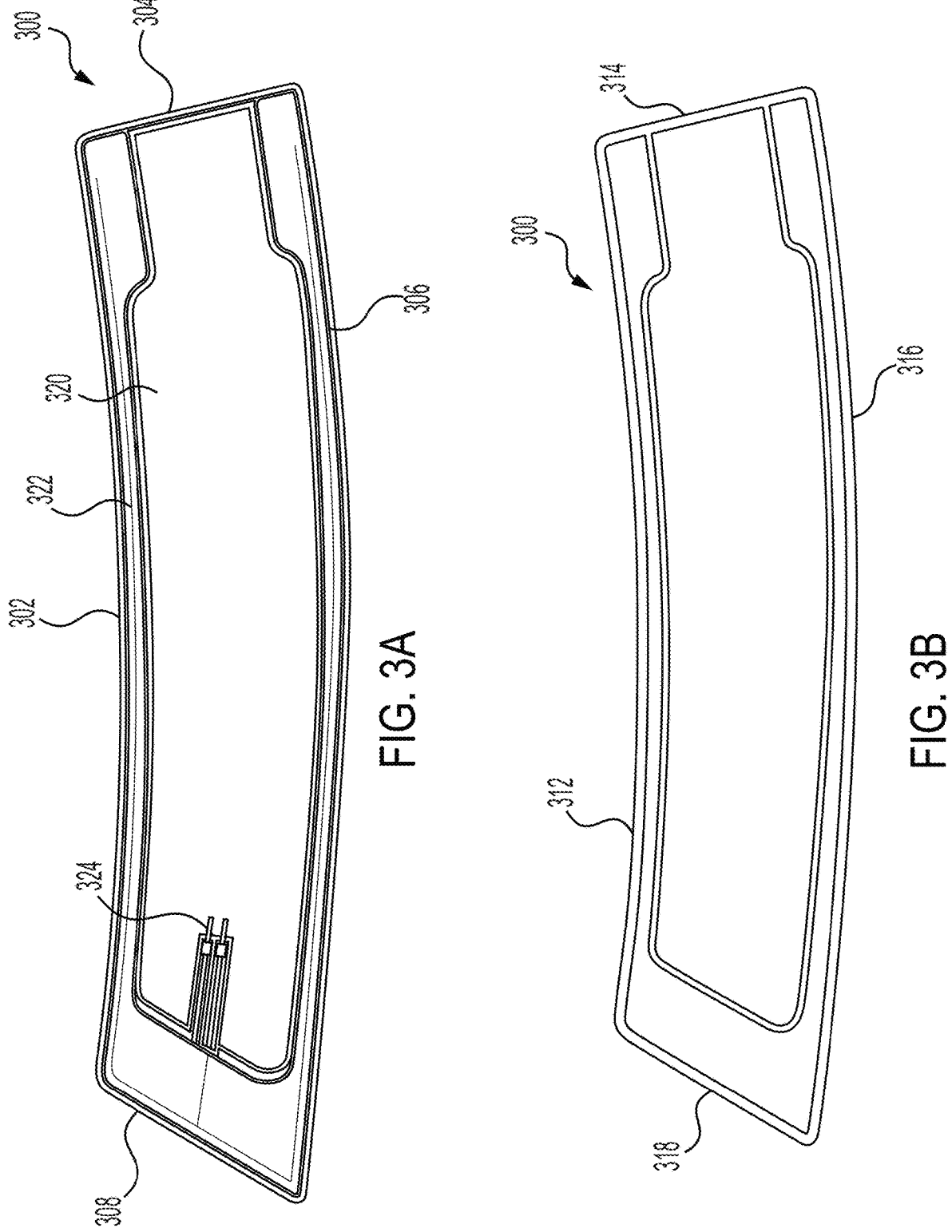
FIGS. 3A-3B illustrate a second flexible light panel.

FIGS. 3A-3B illustrate a second flexible light panel 300 suitable for use with a tail light housing for a 964 Porsche. FIG. 3A is a view of the back of the flexible light panel (i.e., the side that faces into the interior of the tail light housing) and FIG. 3B is a view of the front of the flexible light panel (i.e., the side that faces the outside of the vehicle and is positioned adjacent the lens).

The flexible light panel 300 has a length greater than a width. The flexible light panel 300 also has a cutout 320. A convex curved first edge 302 is along a length, a second edge 304 along a width is at a 90 degree angle from the first edge 202, a concave curved third edge 306 is along the length at a 90 degree angle from the second edge 204, and a fourth edge 208 along the width has an angle less than 90 degrees to the third edge and greater than 90 degrees to the first edge. A pair of wires 324 with female terminals extend from an interior side of the fourth edge 308 of the light panel. An area of circuitry 322 is shown around the perimeter of the flexible light panel 300 which surrounds three sides of the cutout 320. The front side of the flexible light panel with the circuitry removed and an overprint included is illustrated in FIG. 3B. A convex curved first edge 312 is along a length, a second edge 314 along a width is at a 90 degree angle from the convex curved first edge 312, concave curved a third edge 316 is along the length at a 90 degree angle from the second edge 314, and a fourth edge 318 along the width has an angle less than 90 degrees to the third edge and greater than 90 degrees to the first edge. The cutout 320 is surrounded on three sides by a red electroluminescent lamp 322 with light overprint to achieve a less fluorescent effect.

FIGS. 4A-4L illustrate a bracket 400 for a tail light housing operable to be positioned inside the housing. From a first side, the inner bracket 400 has a flat first side 402 opposing a third side 406, a flat second side 404 with a recess 405 is positioned on a side between the flat first side and the flat second side, a convex side 408 is positioned opposite the second side. From the side view in FIG. 4B and the interior view in FIGS. 4C and 4F, a pair of parallel positioned vertical ridges 410, 411 are positioned along the interior surface of the inner bracket between the flat first side 402 and the third side 406. A shorter pair of parallel positioned vertical ridges 412, 413 are positioned along the interior surface of the inner bracket interior to the first pair of inner brackets. A perpendicular bracket 414 is positioned adjacent the shorter pair of parallel positioned vertical ridges 412, 413 and an elongated oval recess 418 is positioned perpendicular to the perpendicular bracket 414 and in the same orientation as the vertical ridges adjacent the aperture 416. The ridges provide mechanical stability to the bracket and the elongated oval recess 418. The elongated oval recess 418 is a cavity built into the bracket to allow space for the original tension spring that held the reflector lens in the original housing. The original light bulb sits behind the reflector lens. Providing the elongated oval recess 418 allows the user to avoid the need to break off a tab (not shown) on the housing to accommodate the new component.

Figure 4A:
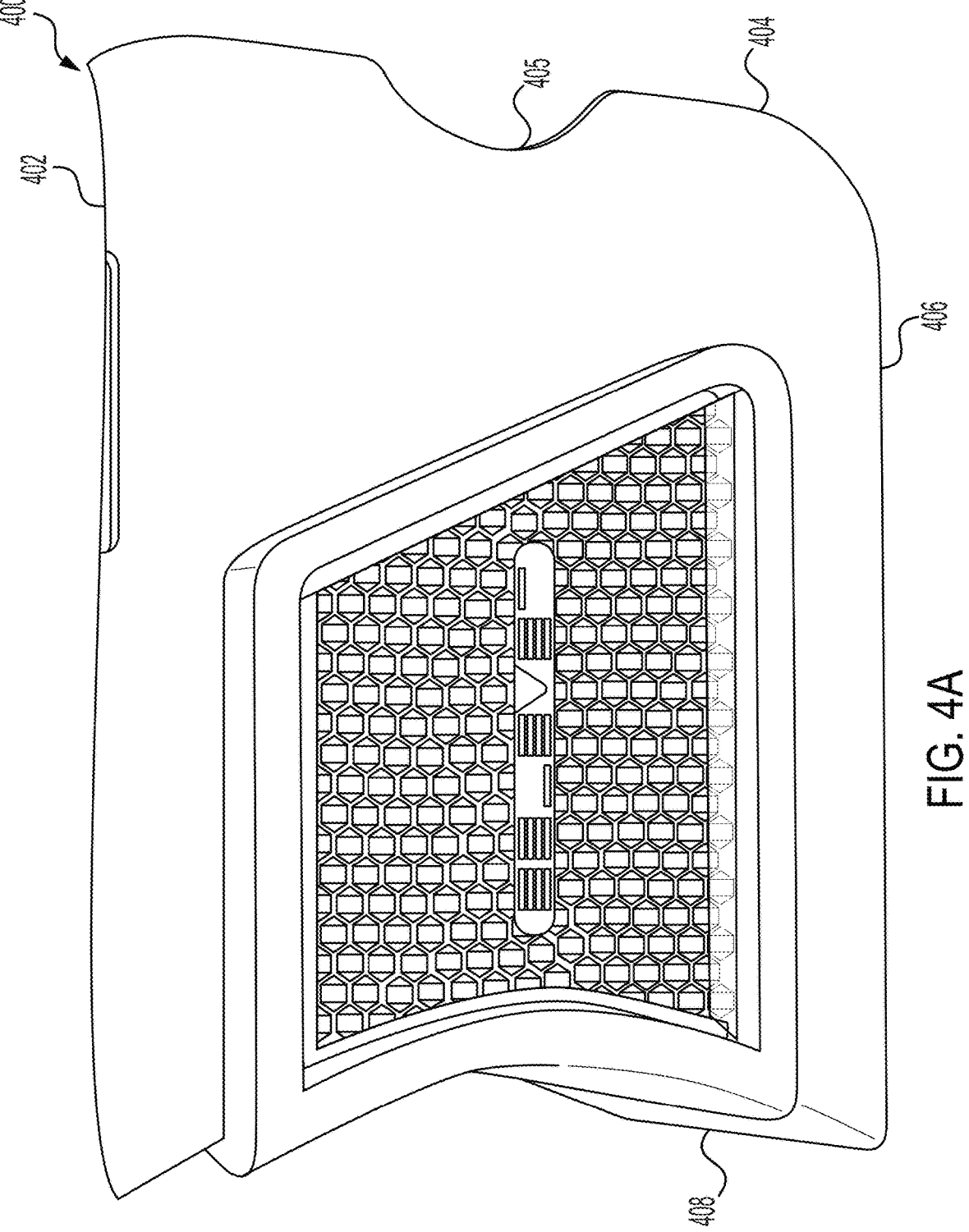
FIGS. 4A-4L illustrate an inner bracket for a tail light housing.
Figures 4B, 4C, 4D:
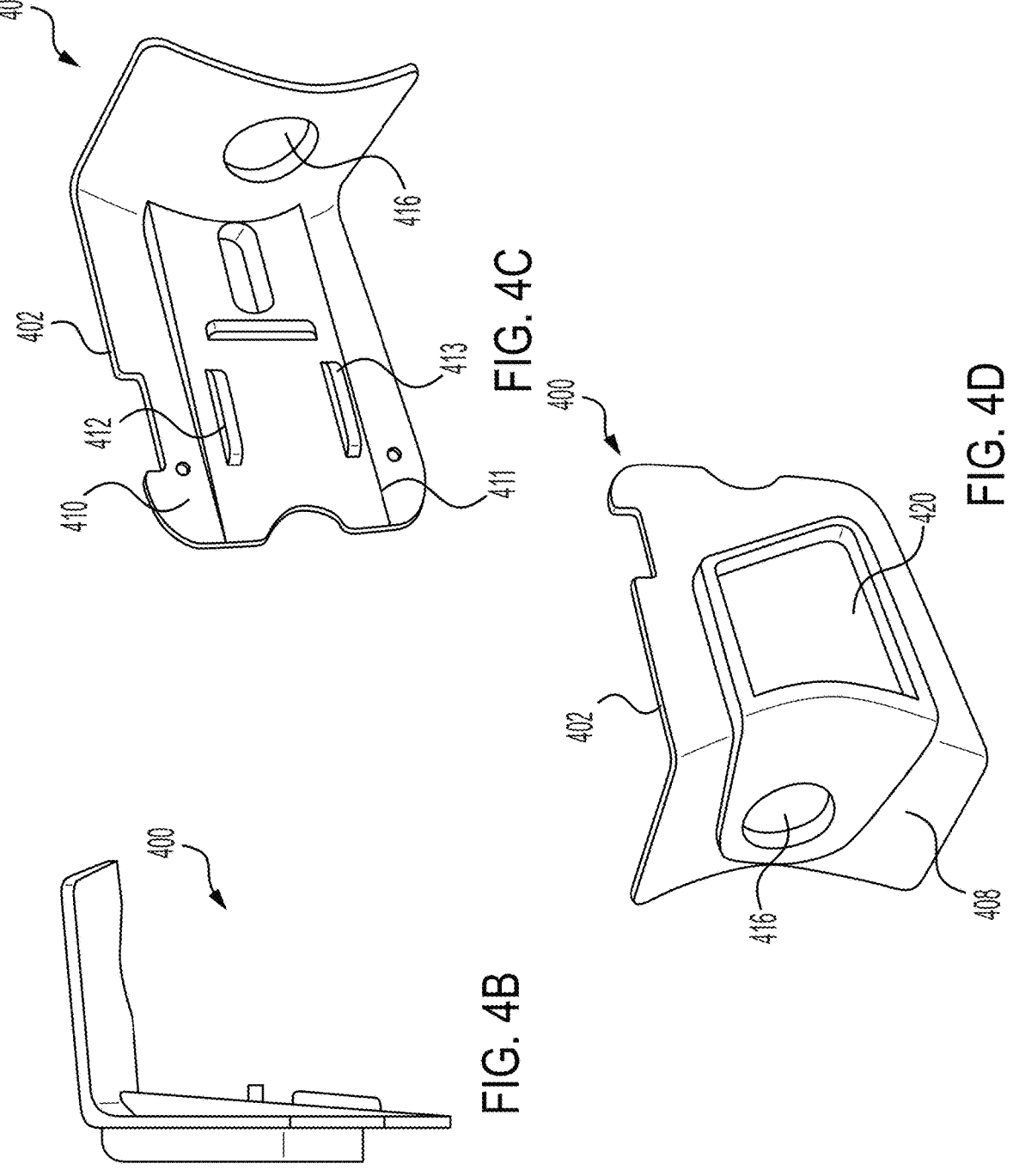
Figures 4E, 4F, 4G:
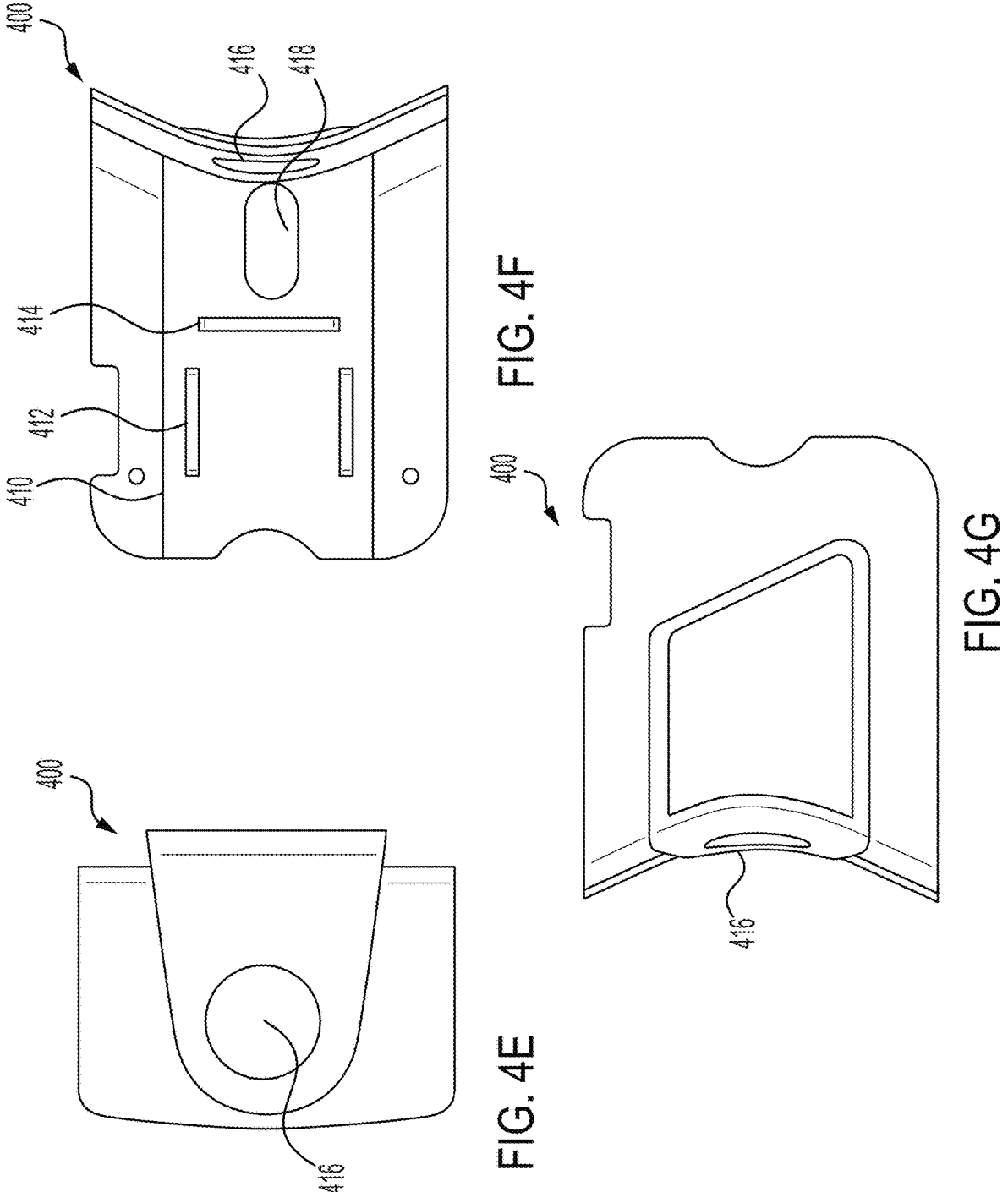
Figures 4H, 4I:
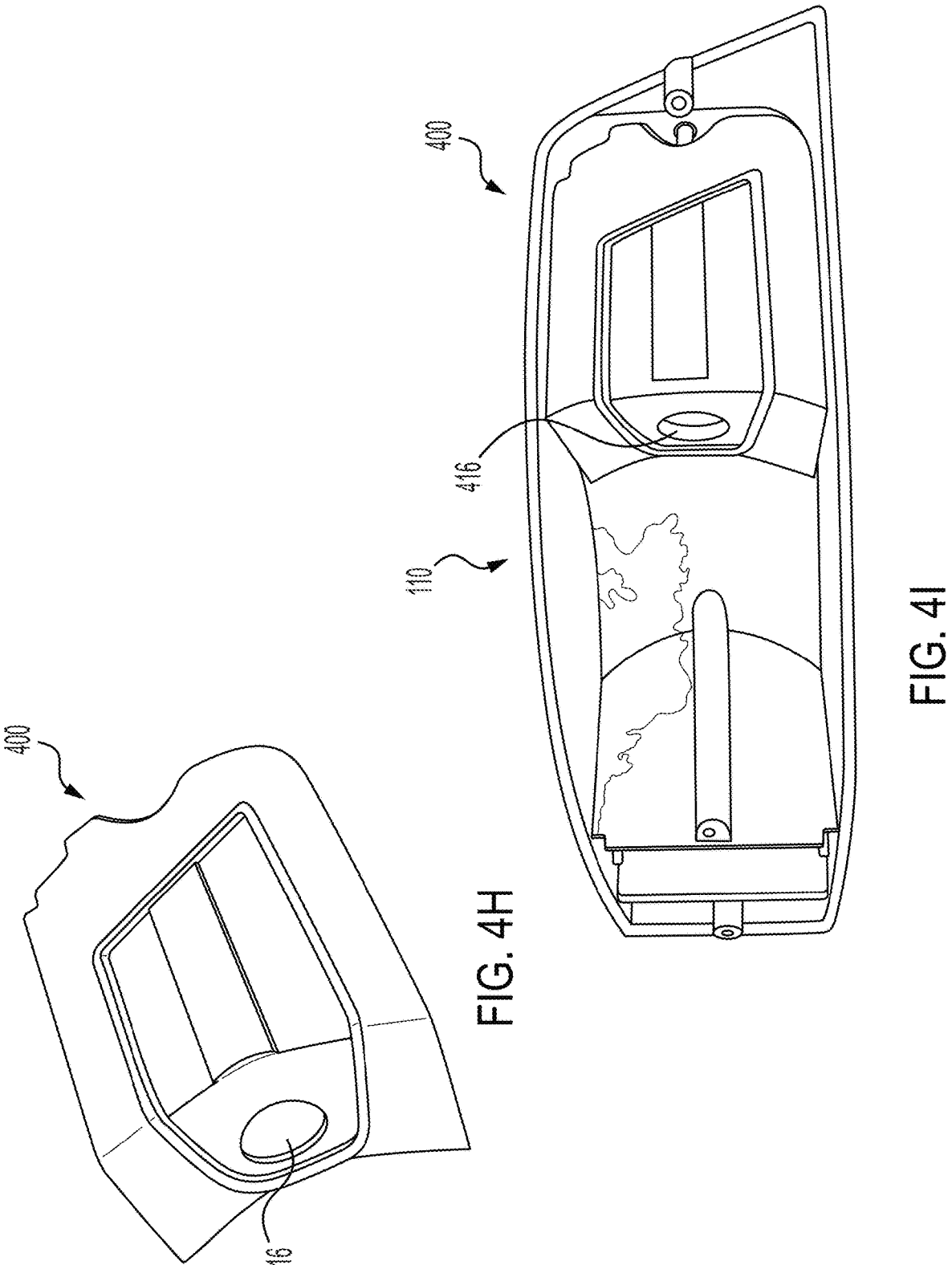
Figures 4J, 4K, 4L:
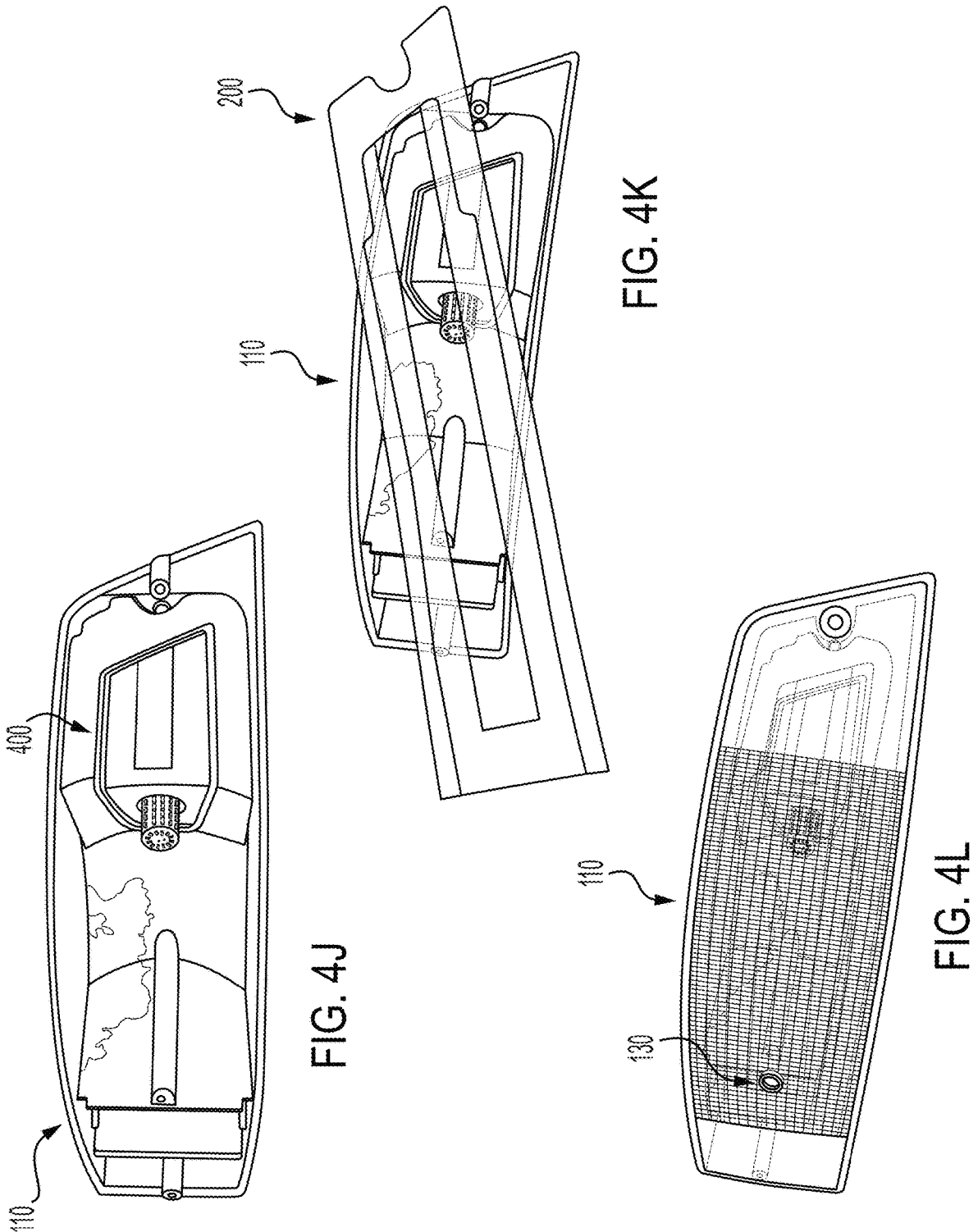

The convex side has an elongated member with an aperture 416. As shown in FIGS. 4D and 4E, a recess 420 is provided in the face of the bracket. The recess 420 is provided to receive a lens that houses the LED and reflects light. FIG. 4I illustrates the bracket 400 inserted into the tail light housing 110. FIG. 4J illustrates the bracket 400 inserted into the tail light housing 110 with a light bulb or LED light 450 extending out of the aperture 416 into the interior of the housing. FIG. 4K illustrates the flexible light panel 200 positioned adjacent the tail light housing 110 with the bracket 400 inserted therein. FIG. 4L illustrates the flexible light panel 200 positioned adjacent the tail light housing 110 with the bracket 400 inserted therein and the lens 130 positioned over the flexible light panel 200. Although FIG. 4 has been illustrated with respect to the tail light housing used for a 911 Porsche and the flexible light panel 200, persons of skill in the art would appreciate that a similar sequence would relate to the tail light housing used for a 964 Porsche and the flexible light panel 300 illustrated in FIG. 3.

Figure 5:
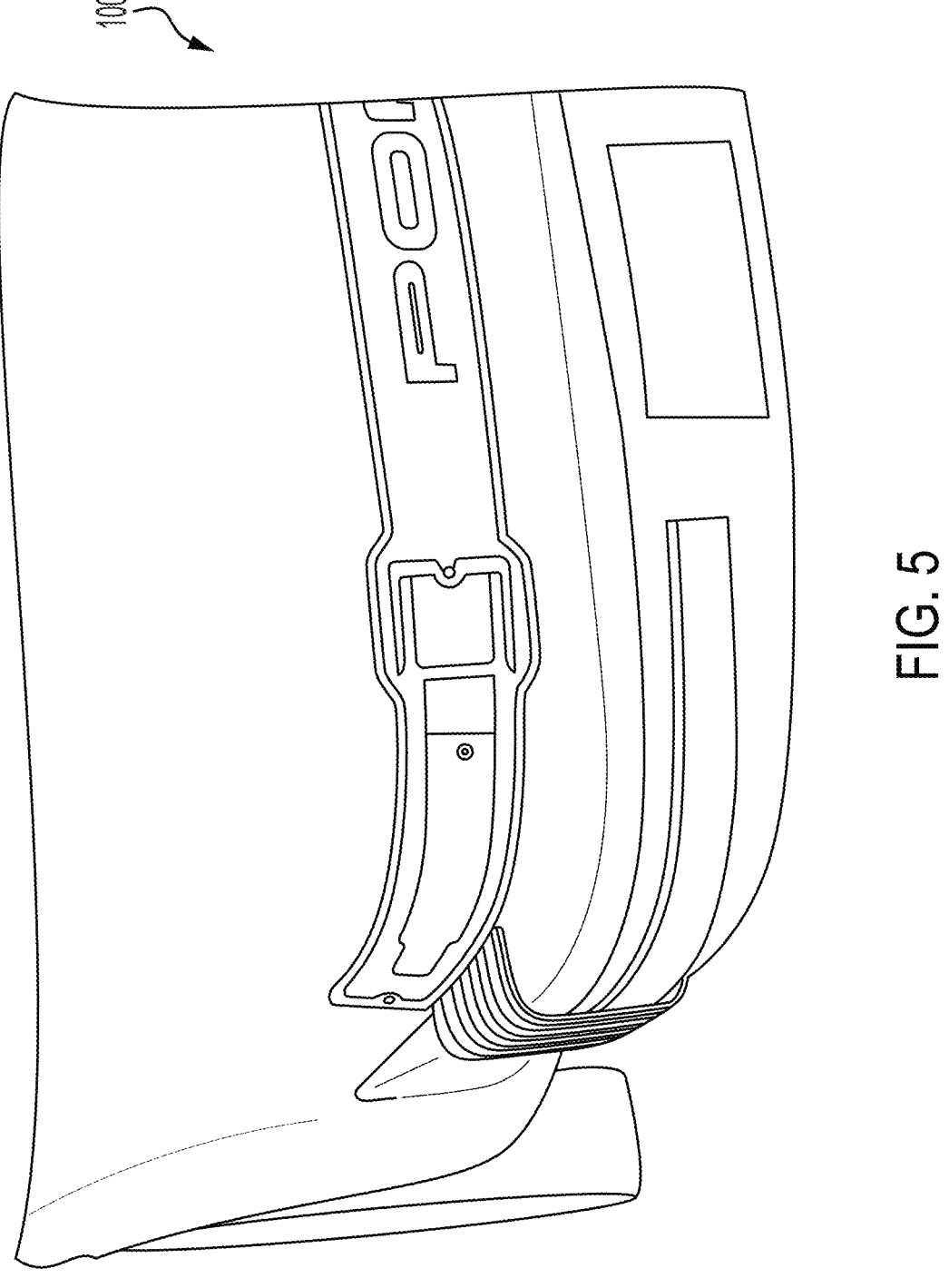
FIG. 5 illustrates a vehicle with a rear tail light according to the disclosure.

FIG. 5 illustrates a portion of the rear of a vehicle with the flexible light panel installed.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:

1. A tail light assembly affixable to a body of a motor vehicle comprising:
   a housing defining an inner surface of the tail light assembly affixable to the body of the motor vehicle by a fastener;
   a light source positionable within an interior of the housing;
   a flexible light panel positionable over at least a portion of the light source;
   one or more lenses positionable over the flexible light panel; and
   a concave recess on a second edge of the flexible light panel positioned midway between a first edge of the flexible light panel and a third edge of the flexible light panel.

2. The tail light assembly of claim 1 wherein the flexible light panel has a length greater than a width.

3. The tail light assembly of claim 1 wherein the flexible light panel has a cutout.

4. The tail light assembly of claim 1 wherein the flexible light panel has the first edge along a length, the second edge along a width oriented at a 90 degree angle from the first edge, the third edge along the length oriented at a 90 degree angle from the second edge, and a fourth edge along the width oriented at an angle less than 90 degrees to the third edge.

5. The tail light assembly of claim 1, further comprising a second concave recess on a fourth edge of the flexible light panel positioned midway between the third edge and the first edge.

6. The tail light assembly of claim 1 wherein the flexible light panel is an electroluminescent light panel.

7. The tail light assembly of claim 1 further comprising a cutout surrounded on three sides by a red EL lamp with light overprint.

8. The tail light assembly of claim 1 further comprising a pair of wires with female terminals extending from the first edge of the light panel near a fourth edge of the light panel.

9. The tail light assembly of claim 1 further comprising an area of circuitry on a silk screened border around a perimeter of the flexible light panel.

10. A flexible light panel comprising:
   a first edge, a second edge, a third edge and a fourth edge;
   a first cutout on the second edge positioned midway between the first edge and the third edge;
   a pair of wires with female terminals extending from the first edge of the light panel near the fourth edge of the light panel,
   wherein the flexible light panel has a length greater than a width and a first edge along a length, a second edge along a width oriented at a 90 degree angle from the first edge, a third edge along the length oriented at a 90 degree angle from the second edge, and a fourth edge along the width oriented at an angle less than 90 degrees to the third edge; and
   a second cutout on the fourth edge positioned midway between the third edge and the first edge.

11. The flexible light panel of claim 10 wherein the flexible light panel is an electroluminescent light panel.

12. The flexible light panel of claim 10 further comprising a third cutout surrounded on three sides by a red electroluminescent lamp with light overprint.

13. The flexible light panel of claim 10 further comprising an area of circuitry on a silk screened border around a perimeter of the flexible light panel.

14. A motor vehicle, comprising:
   a body component defining a trunk and a trunk gutter;
   a weather strip attached the trunk gutter;
   a trunk lid adapted to be disposed in the trunk gutter when in a closed position; and
   a tail light assembly affixed to the body component, comprising:
      a housing defining an inner surface of the tail light assembly affixable to the body component of the motor vehicle by a fastener;
      a light source positionable within an interior of the housing;
      a flexible light panel positionable over at least a portion of the light source; and
      one or more lenses positionable over the flexible light panel.

15. A tail light assembly affixable to a body of a motor vehicle comprising:
   a housing defining an inner surface of the tail light assembly affixable to the body of the motor vehicle by a fastener;
   a light source positionable within an interior of the housing;
   a flexible light panel positionable over at least a portion of the light source;
   one or more lenses positionable over the flexible light panel; and
   a cutout surrounded on three sides by a red EL lamp with light overprint.

16. A tail light assembly affixable to a body of a motor vehicle comprising:
   a housing defining an inner surface of the tail light assembly affixable to the body of the motor vehicle by a fastener;
   a light source positionable within an interior of the housing;
   a flexible light panel positionable over at least a portion of the light source;
   one or more lenses positionable over the flexible light panel; and
   an area of circuitry on a silk screened border around a perimeter of the flexible light panel.

17. A flexible light panel comprising:
   a first edge, a second edge, a third edge and a fourth edge;
   a first cutout on the second edge positioned midway between the first edge and the third edge;
   a pair of wires with female terminals extending from the first edge of the light panel near the fourth edge of the light panel,
   wherein the flexible light panel has a length greater than a width and a first edge along a length, a second edge along a width oriented at a 90 degree angle from the first edge, a third edge along the length oriented at a 90 degree angle from the second edge, and a fourth edge along the width oriented at an angle less than 90 degrees to the third edge; and a second cutout surrounded on three sides by a red electroluminescent lamp with light overprint.

18. A flexible light panel comprising:

a first edge, a second edge, a third edge and a fourth edge;

a first cutout on the second edge positioned midway between the first edge and the third edge;

a pair of wires with female terminals extending from the first edge of the light panel near the fourth edge of the light panel, wherein the flexible light panel has a length greater than a width and a first edge along a length, a second edge along a width oriented at a 90 degree angle from the first edge, a third edge along the length oriented at a 90 degree angle from the second edge, and a fourth edge along the width oriented at an angle less than 90 degrees to the third edge; and an area of circuitry on a silk screened border around a perimeter of the flexible light panel.

\* \* \* \* \*